(12) United States Patent
Bowler

(10) Patent No.: US 6,485,644 B2
(45) Date of Patent: *Nov. 26, 2002

(54) LIQUID DISPENSER WITH CLOSED GRAVITY FILTER AND AIR BREATHING SYSTEM

(76) Inventor: Henry Alan Bowler, 1200 Walden Circle, Unit #73, Mississauga (CA), L5J 4J9

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/327,824

(22) Filed: Jun. 8, 1999

(65) Prior Publication Data

US 2002/0070153 A1 Jun. 13, 2002

Related U.S. Application Data

(60) Provisional application No. 60/088,626, filed on Jun. 9, 1998.

(51) Int. Cl.⁷ .......................... B01D 27/02; B01D 27/08; B01D 35/01
(52) U.S. Cl. ....................... 210/282; 210/468; 210/469; 210/472; 210/473; 222/189.09; 222/189.11
(58) Field of Search .............................. 210/466, 416.3, 210/464, 470, 264, 282, 472, 473, 467–468, 469, 238; 222/189.06, 189.09, 189.11

(56) References Cited

U.S. PATENT DOCUMENTS

| 3,392,837 | A | | 7/1968 | Sanzenbacher |
| 4,024,991 | A | | 5/1977 | Tyson et al. |
| 4,181,243 | A | | 1/1980 | Frahm |
| 4,259,184 | A | | 3/1981 | D'Arnal |
| 4,714,550 | A | * | 12/1987 | Malson et al. ............... 210/244 |
| 4,805,808 | A | | 2/1989 | Larson |
| 4,834,267 | A | | 5/1989 | Schroer et al. |
| 4,842,724 | A | * | 6/1989 | Bray et al. ................... 210/104 |
| 5,049,272 | A | | 9/1991 | Nieweg |
| 5,139,666 | A | | 8/1992 | Charbonneau et al. |
| 5,238,559 | A | | 8/1993 | Nieweg |
| D341,314 | S | | 11/1993 | Charbonneau et al. |
| 5,259,142 | A | * | 11/1993 | Sax |
| 5,676,278 | A | | 10/1997 | Beyer et al. |

FOREIGN PATENT DOCUMENTS

DE               4005352       * 8/1990

* cited by examiner

Primary Examiner—Matthew O. Savage
Assistant Examiner—Marianne Ocampo

(57) ABSTRACT

A water dispenser supports a bottle having a neck closed with a holder accommodating a water filter. The cap member has an inwardly converging sleeve complementary to and engageable with the outer surface of the filter to retain the filter on the bottle neck. An air bleed hole in the bottle is located at a selected height relative to the exit openings of the filter to control maximum flow rate of fluid through the filter.

23 Claims, 4 Drawing Sheets

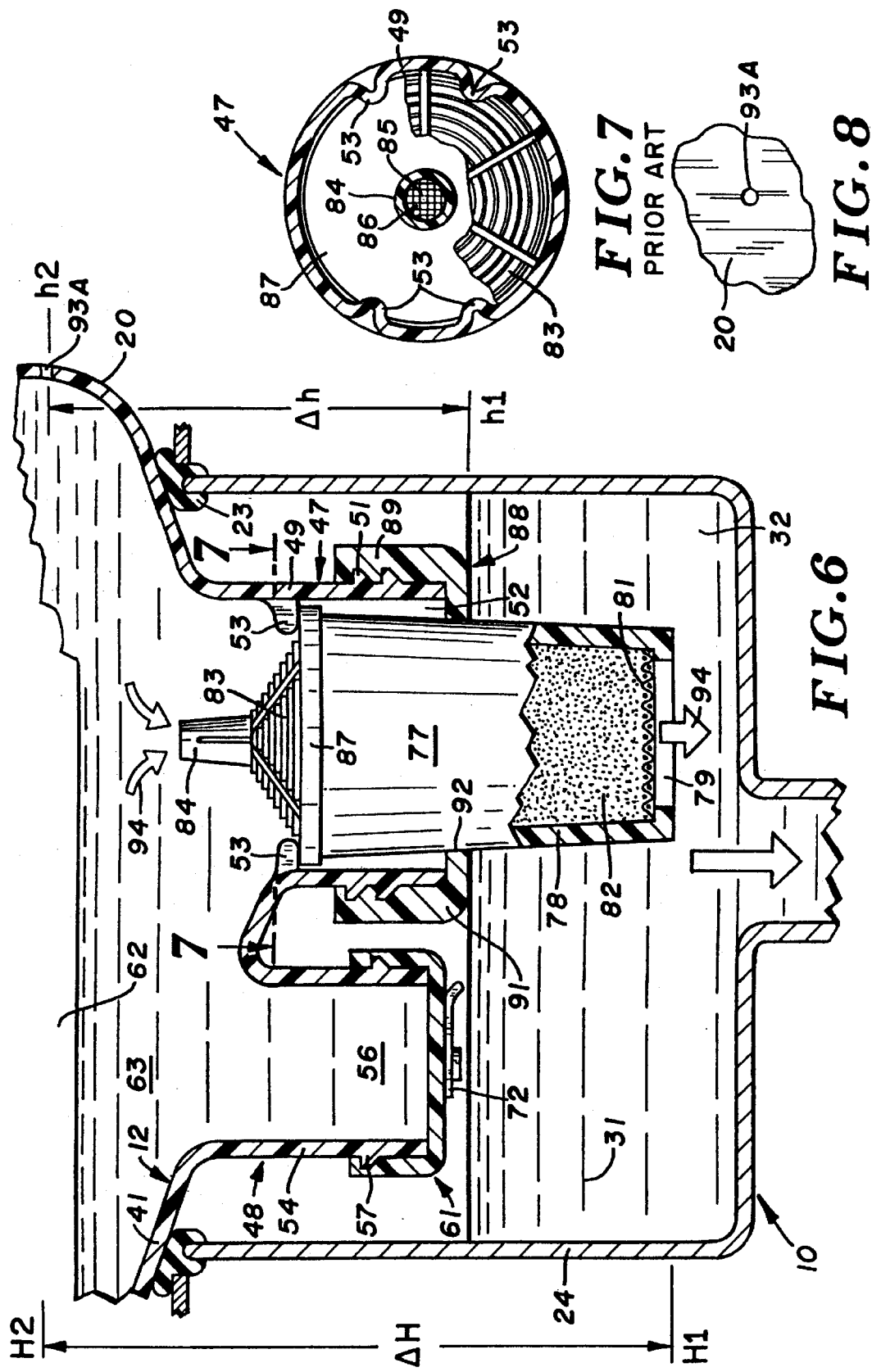

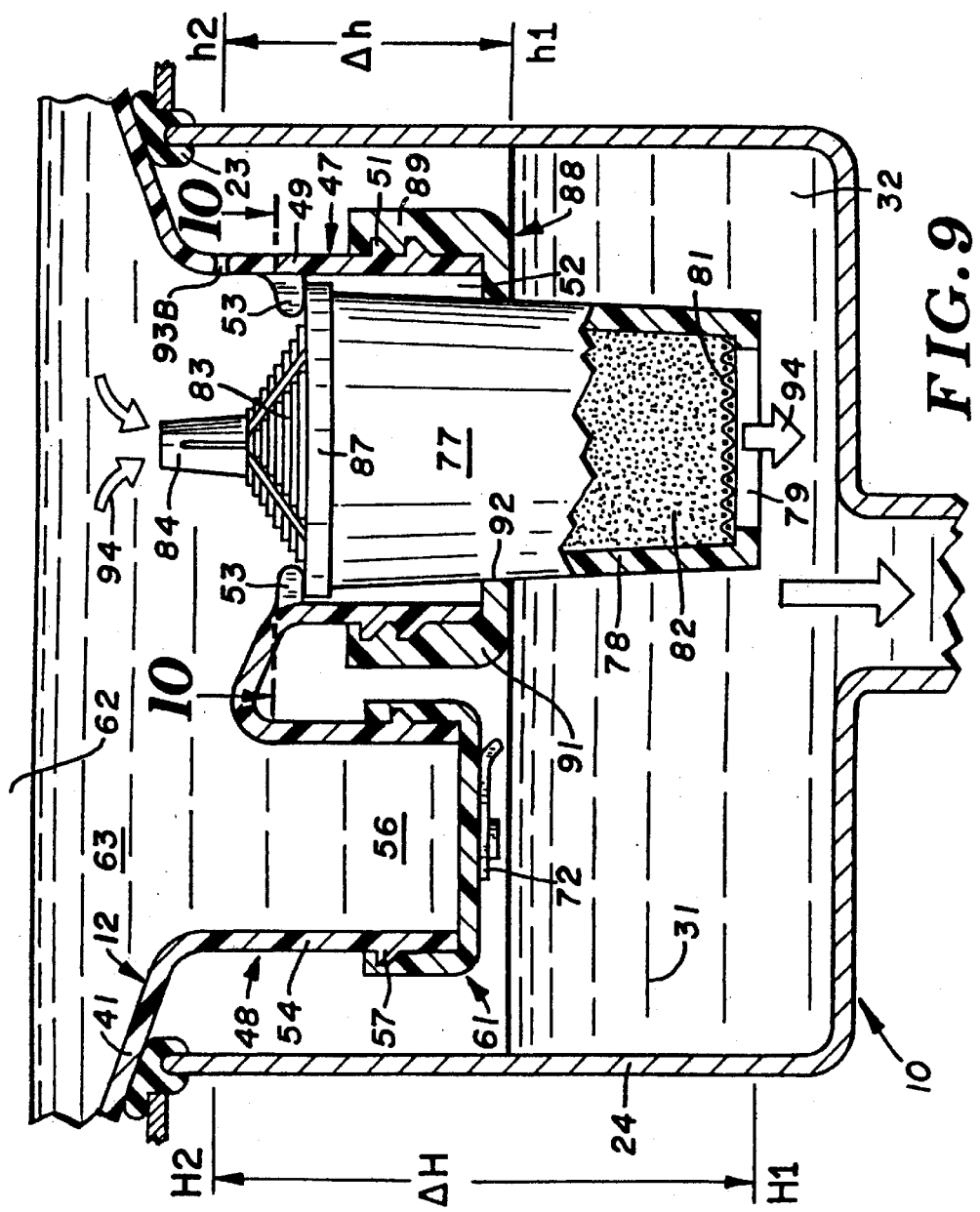
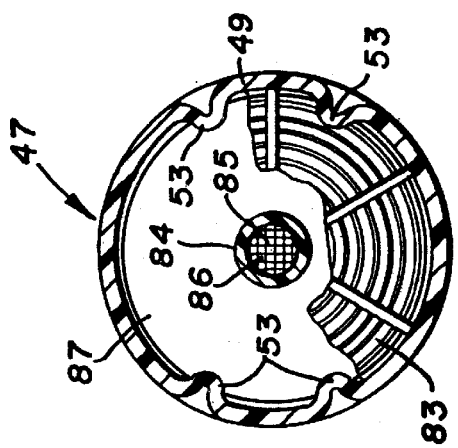
FIG. 10 PRIOR ART
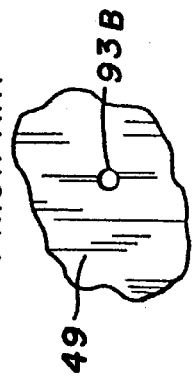
FIG. 11
FIG. 9

LIQUID DISPENSER WITH CLOSED GRAVITY FILTER AND AIR BREATHING SYSTEM

CROSS REFERENCE TO RELATED APPLICATION

This application is a continuation of U.S. Provisional Patent Application Serial No. 60/088,626 filed Jun. 9, 1999.

FIELD OF THE INVENTION

The invention relates to drinking water dispensers having bottles for storing water and filters associated with the bottles for filtering water flowing from the bottles into the dispensers at controlled rates.

BACKGROUND OF THE INVENTION

Water dispensers using bottled water have been in use for a number of years. When the water in the bottle has been dispensed, the empty bottle is replaced with a full bottle of water. Bottled water can be natural water or purified water processed at a location remote from the point of use. The processing and handling of bottled water is costly and not economically available to all persons. Community or rural water can be used in the bottles to supply water for dispensers. While community water utilities treat water to meet minimum standards for purity, persons that depend on private wells and other water sources have no assurance of water purity. Filtering devices provided with activated carbon, mechanical filters, reverse osmosis systems and ultraviolet light have been used to treat water. These devices are installed on point of entry locations as water taps or incorporated in portable containers or canteens. Examples of portable containers equipped with water conditioning devices are disclosed by W. A. Sanzenbacher in U.S. Pat. No. 3,392,837 issued Jul. 16, 1968, and W. S. Malson and J. W. Sharpe in U.S. Pat. No. 4,714,550 issued Dec. 22, 1987. These containers cannot be inverted and used with a water dispenser.

A container and filter device is disclosed by G. L. Charbonneau, A. H. Bowler and E. W. Bock in U.S. Pat. No. 5,139,666 issued Aug. 18, 1992. This device includes an air hole in a ring adjacent the filter to allow a flow of air into the enclosed container when the pressure within the container has been reduced by the outflow of filtered liquid. The water pressure in this system that regulates the flow of liquid through the filter, is minimal. The hydrostatic equilibrium exerts virtually no pressure on the filter to overcome the internal flow resistance of the filtering materials. The flow through the filter is reduced to the capillary suction effect between the filtering materials and is, therefore, largely dependent on the filter medium. This may result in a blockage of the filter whereby no filtered liquid can exit the filter. Blockage of the filter may cause air to enter the filter which could lead to oxidization and contamination of the filtering material. Matching the various available filters to this type of filtration system is very difficult.

SUMMARY OF THE INVENTION

The invention comprises a bottle for storing liquid, such as drinking water or tap water, for use with a water dispenser having a filter within the neck of the bottle to provide the dispenser with a supply of filtered water at a controllable flow rate without interruption. The bottle has a side wall joined to top and bottom walls providing a chamber for accommodating water. The top wall of the bottle has a neck having a passage open to the chamber. A combined bottle cap and filter holder removably mounted on the neck of the bottle functions to close the bottle neck passage and position a filter in the passage. The filter functions to remove contaminants and other substances from the water as the water flows through the filter from the chamber into the dispenser. The maximum water flow rate through the filter is controlled by the position of an air bleed hole in the bottle relative to the bottom of the filter. To increase the maximum flow rate through the filter the distance between the air hole in the bottle and the bottom of the filter is increased. Increasing the maximum flow rate of the water minimizes blockage of the filter.

The bottle has a tubular neck. The filter has an inlet end open to the chamber of the bottle, an outlet end open to the dispenser, and filtering material located between the inlet and outlet ends for removing contaminants and other substances from the water flowing through the filtering material into the dispenser. A combined ring and filter holder releasably mounted on the neck engages the filter to retain the filter on the neck and close the passage in the neck around the filter. The bottle has a small air bleed hole open to the bottle chamber to allow external air to flow into the bottle chamber to replace water flowing from the chamber and reduce the vacuum pressure in the bottle chamber above the water in the bottle chamber. The air hole is located above the bottom of the filter at a predetermined optimum level to permit a maximum water flow rate through the filter that minimizes filter blockage and prevent flooding out of the treated water dispenser.

The location of the air bleed hole in the bottle also determines the minimum water flow rate through the filter which controls the extraction efficiency of the filter for removal of contaminants from the water. The air bleed hole is located in the side wall, top wall or neck of the bottle. The location of the air bleed hole in the bottle determines the maximum level of water in the dispenser. Preferably the stall level of the water is located adjacent a mid-point of the filter whereby the filtering material is submerged with water. This prevents the filter from running dry and prevents interruption of the flow of water through the filter. The filter can be removed from the neck by removing the holder and filter from the neck. A new filter is then inserted in the holder until the tapered edge thereon engages the side wall of the filter. The filter is placed in the passage of the neck and the holder is turned on the neck. The holder has an annular inside edge that engages the side wall of the filter in a tight fit relation to retain the filter on the neck and close the passage in the neck of the bottle.

The filter is effective to remove contaminants from six to ten or more bottles of water. When the selected number of bottles of water have been filtered, the cap member accommodating the filter is removed from the neck. The filter is removed from the cap member and replaced with a new filter. The bottle and filter of the invention can use community and well water which is filtered to remove contaminants prior to the dispensing into a drinking container.

DESCRIPTION OF THE DRAWINGS

FIG. 6 is a sectional view similar to FIG. 3 showing the air bleed hole in the side wall of the bottle;

FIG. 7 is a sectional view taken along line 7—7 of FIG. 6;

FIG. 8 is a side elevational view of a portion of the side wall of the bottle showing the air bleed hole;

FIG. 9 is a sectional view similar to FIG. 3 showing the air bleed hole in the neck of the bottle;

FIG. 10 is a sectional view taken along the line 10—10 of FIG. 9; and

FIG. 11 is a side elevational view of a portion of the neck of the bottle showing the air bleed hole.

DESCRIPTION OF PREFERRED EMBODIMENTS

Figure 1:
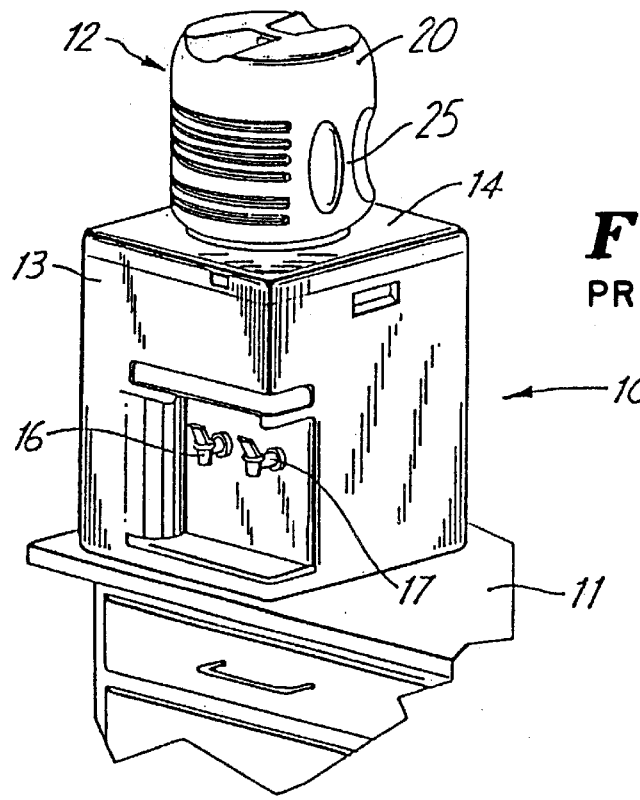
FIG. 1 is a perspective view of a liquid dispenser supporting the bottle and filter of the invention.
Figure 2:
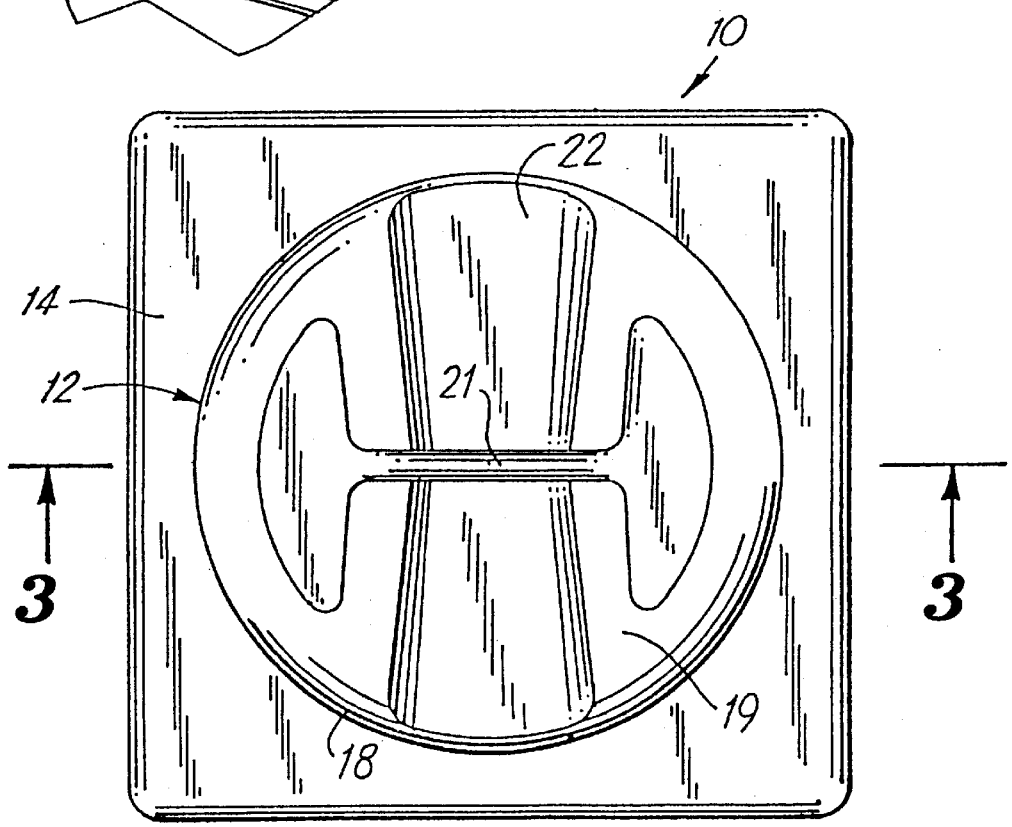
FIG. 2 is an enlarged top view of FIG. 1.

Referring to FIGS. 1 and 2, there is shown a liquid dispenser, indicated generally at 10, supported on a table or counter 11. An inverted bottle, indicated generally at 12, storing liquid, such as tap water, is mounted on top of dispenser 10. The liquid stored in the bottle disclosed herein is drinking water. The water flows through a filter which removes contaminants from the water. Other types of liquids and mixtures of liquids can be accommodated by bottle 12. Dispenser 10 includes a generally rectangular cabinet 13 having a top wall 14 enclosing a chamber for accommodating cooling coils and/or heating coils (not shown) for cooling and heating the water. The front of the cabinet has a pair of hand operated valves 16 and 17 which are manually operated to allow either hot or cold water to flow into a glass or cup. Dispenser 10 is a commercial product and does not form part of the invention. Other types of liquid dispensers can be used with the bottle and filter of the invention.

Bottle 12 is a one piece blow molded plastic container having a bottom section 18 that converges inwardly into a generally flat bottom wall 19 to permit bottle 12 to rest stably on a flat support. Bottom wall 19 has a handle 21 spanning a recess 22. Bottom wall 19 is joined to an annular side wall 20 having a generally upright handle 25. Handle 25 is located generally in the mid-section of side wall 20. Handles 21 and 25 are used to hand manipulate bottle 12 and aid in the inverting of bottle 12 onto dispenser 10 and locate top wall 41 in annular surface engagement with seal 23.

Figure 4:
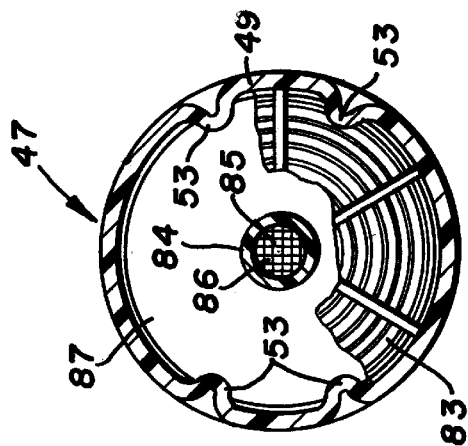
FIG. 4 is a sectional view taken along the line 4—4 of FIG. 3.
Figure 3:
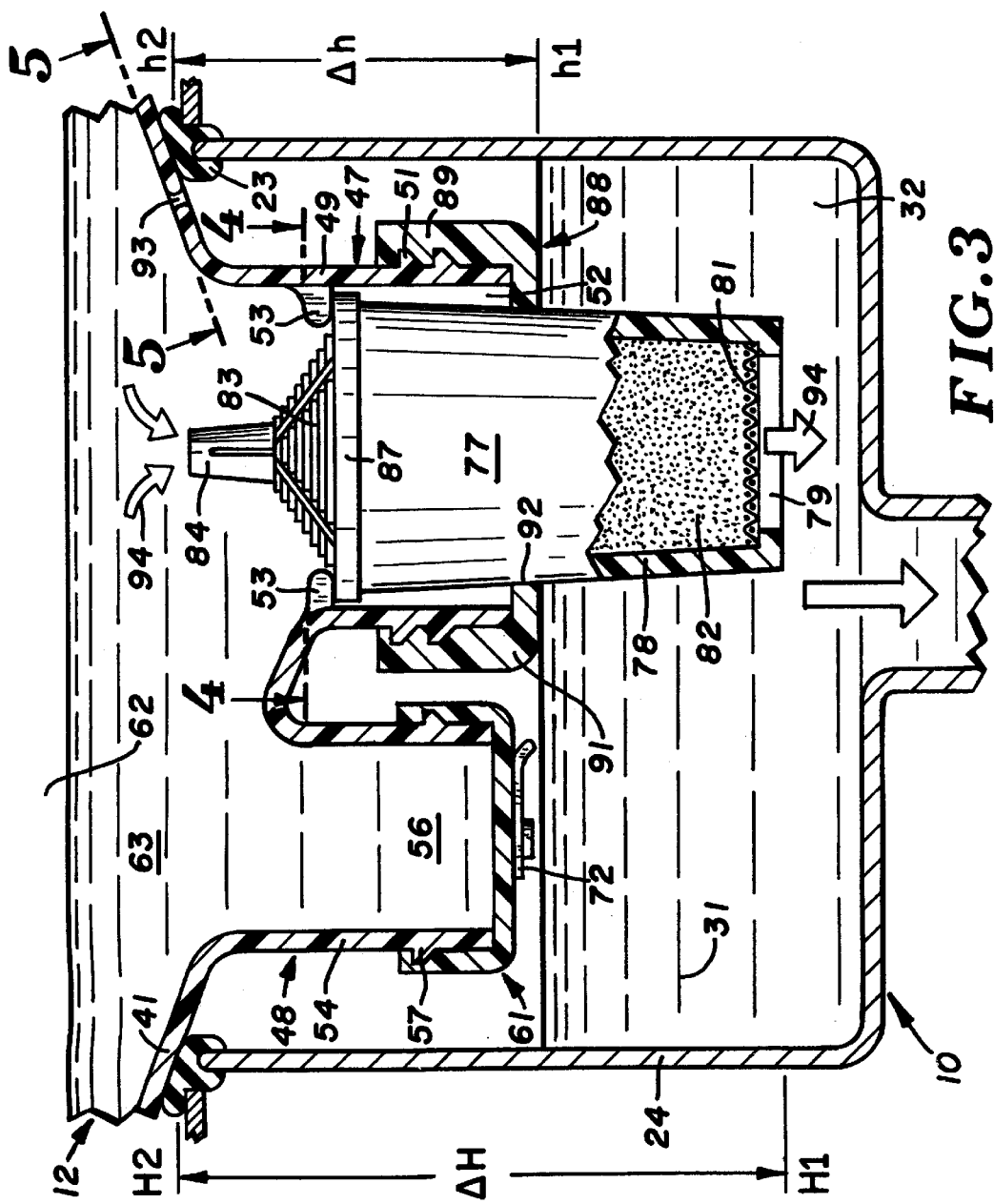
FIG. 3 is an enlarged sectional view taken along the line 3—3 of FIG. 2 showing the air bleed hole in the top wall of the bottle.

As shown in FIG. 3, a filter neck and fill neck, indicated generally at 47 and 48, respectively, are joined to top wall 41. A bottle having a single neck for the filter can be used with the air breathing system of the invention. FIG. 3 shows bottle 12 in the inverted water dispensing position. Filter neck 47 has a tubular cylindrical wall 49 having external threads 51 surrounding a passage 52 open to chamber 62 of bottle 12. A plurality of short fingers or projections 53 joined to wall 49 project into passage 52 above the open end of wall 49. As shown in FIG. 4, projections 53 are indented portions of wall 49 circumferentially spaced around wall 49. The stop function of projections 53 are hereinafter described.

Fill neck 48 has an annular wall 54 surrounding a passage 56 open to bottle chamber 62 to allow water to flow into chamber 62 to fill bottle 12 with water. Wall 54 has a diameter smaller than the diameter of wall 49 and a height smaller than the height of wall 49. Walls 49 and 54 are tubular extensions of top wall 41 offset from the central longitudinal axis of bottle 12. The axes of passage 52 and 56 are parallel with and on opposite sides of the central longitudinal axis of bottle 12. The opposite outer sides of walls 49 and 54 are about equidistant from the central longitudinal axis of bottle 12 leaving top wall 41 with a substantial annular surface adapted to engage seal 23 and seals or top edges of tank 24 of different diameters.

A cap, indicated generally at 61, is turned onto threads 57 to close passage 56 to retain water in bottle 12. Cap 61 includes a refill counter 72 used to show the number of times that the bottle has been filled with water.

Figure 5:
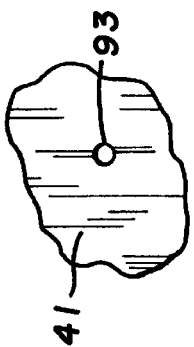
FIG. 5 is a sectional view taken along the line 5—5 of FIG. 3.

Referring to FIGS. 3, 4 and 5, a filter indicated generally at 77, is used with bottle 12 to remove contaminants from the water flowing from bottle 12 into dispenser 10. Filter 77 has a generally cylindrical casing 78 with a porous bottom wall 79 extending across the bottom of casing 78. Casing 78 has a generally inwardly converging cylindrical outer surface. Bottom wall 79 of casing 78 has a screen 81 that retains water filtering material 82 within casing 78 while allowing water to flow from bottle 12 into dispenser 10. As seen in FIG. 3, bottom wall 79 has a plurality of concentrically located arcuate slots or openings to permit water flow through filter 77. Filtering material 82 functions to remove from water minerals, salts, particulates, pediments, nitrates, chemical contaminants, chlorine, chloramines, trihalomethanes, and objectionable taste, color, and odors, herein broadly called contaminants. Some filtering materials, such as fibrous material, porous ceramics or diatomaceous earth, can remove bacteria, cryptosporidium, and asbestos fibers from water. An example of a water filtering material is mineral and activated carbon mixture with activated carbon particles coated with silver to control bacterial buildup in the filtering material and ion exchange resins to remove contaminant metals, such as lead and mercury. The filtering material can be selected for the particulate contaminants that are present in the water. The resistance to the flow of water through the filtering material varies with the type and granular size of the filtering material.

The top of casing 78 is closed with a cover 83 having a plurality of rings that are concentrically located around a cylindrical projection 84. Ribs extending radially from projection 84 support the rings above filtering material 82. Slots between adjacent rings allow water to flow from bottle 12 through filtering material 82 contained within casing 78 to chamber 32 and tank 24. A screen 85, shown in FIG. 4, extends across the top of casing 78 between cover 83 and filtering material 82 to retain filtering material 82 within casing 78. An example of a filter is shown by H. Nieweg in U.S. Pat. No. 5,049,272.

Filter 77 is retained on neck 47 with an annular ring member or holder indicated generally at 88. Filter 77 is located in the internal passage of neck 47. Holder 88 has a sleeve 89 with internal threads that cooperate with threads 51 on neck 47 to releasably hold holder 88 on neck 47. An inwardly extended annular wall 91 having an annular internal tapered surface or edge 92 is joined to sleeve 89. Edge 92 engages the outside surface of casing 78 to center filter 77 on neck 47, hold flange 87 in engagement with projections 53, and close passage 52. Wall 41 of bottle 12 has a small air bleed hole 93, such as a hole having a diameter of about 0.5 mm, which permits air to flow into bottle chamber 62 when the level of the water 31 in tank reservoir or chamber 32 falls below the stall point of flow of water through filter 77. As shown in FIG. 3, the distance Δh is the difference in elevation h2 of hole 93 and the level h1 of the water 31 in tank 24 at the stall point or filter shut down of filter 77. The distance ΔH is the difference in elevation H2 of hole 93 and the bottom level H1 of filter 77. The air breathing system takes advantage of the stall point or filter shut down of filter 77 which is Δh below air bleed hole 93. For example, the filter cartridge shown in U.S. Pat. No. 5,049,272 has a shut down distance Δh of about 4.5 cm operating in a closed gravity system. The ΔH distance has a minimum of about 10 cm. The small air bleed hole 93 in top wall 41 of bottle 12 is spaced a distance ΔH above the bottom or base of filter 77. Hole 93 has a diameter of about 0.5 mm which prevents leakage due to water flow resistance of the filtering material. The size of hole 93 can be changed in accordance with the water flow resistance of the filtering material. As shown in FIG. 6, air bleed hole 93A is in the side wall 20 of bottle 12 to increase the ΔH and Δh to accommodate for greater water flow resistance of the filtering material in the filter cartridge. The parts of the bottle, filter, and tank shown in FIGS. 6 to 8 that correspond to the same parts of bottle 12, tank 24, and filter 77 have the same reference numbers.

As shown in FIG. 9, air bleed hole 931B is in the neck of bottle 12 to decrease the ΔH to Δh to decrease water flow resistance of filtering material in the filter cartridge. The location of hole 93B in neck 49 in used for small filters with low internal filter resistances. The parts of the bottle, filter, and tank shown in FIGS. 9 to 11 that correspond to the same parts of bottle 12, tank 24, and filter 77 have the same reference numbers.

The distance ΔH establishes the maximum hydrostatic pressure acting on filter 77. During reservoir fill up or heavy water usage conditions, the filtering operation is at maximum hydrostatic pressure of ΔH. Once the water in the reservoir 32 of tank 24 has reached the bottom of filter 77 the water level in the reservoir increases and the hydrostatic pressure acting on the filter begins to drop until the stall point of filter 77 is reached. At this water level there is insufficient hydrostatic pressure acting on filter 77 to draw air into bottle 12 to permit water to flow through filter 77. The distance Δh is established by the internal resistance to the flow of water through filtering material 82 and filter 77. The incorporation of holes 93, 93A and 93B in the top wall or the. side wall 20 or neck 49 of bottle 12 eliminates the need of costly molded parts required in complicated air breathing systems, such as disclosed by H. Nieweg in U.S. Pat. No. 5,238,559. The minimum hydrostatic pressure Δh of the water filtering system is at the lowest possible level so that contaminant extraction efficiency is at maximum conditions.

Bottle 12 is used as a supply of filtered water for dispenser 10. The water can be treated or filtered water or conventional tap water. Neck 47 is closed with filter 77. Holder 88 is threaded onto the neck 47 to holder filter 77 in an engagement with the inwardly directed projections 53 which function as stops preventing filter 77 from being pushed into bottle 12. Holder 88 can be readily removed from cylindrical wall 49 by turning it to release sleeve 89 from threads 51 so that filter 77 can be replaced with a new filter. A bottle having a single neck can accommodate filter 77.

Cap 61 is removed from fill neck 48 to provide access to bottle chamber 62. Water from a tap or a container flows through passage 56 into bottle chamber 62. When bottle 12 is full of water, cap 61 is placed back on fill neck 48 to close passage 56. Pointer 72 is initially placed at number 1 to indicated the first bottle of water that flows through filter 77.

Bottle 12 is then placed on dispenser 10 by inverting the bottle and nesting top wall 41 on annular seal 23. Holder 88 along with neck 47 extends downwardly into tank chamber 32. Water 63 in bottle 12 flows through filter 77, as indicated by the arrows 94 in FIG. 3, and collects in tank chamber 32.

The air flows through air hole 93 in top wall 41 or hole 93A in side wall 20 or hole 93B in neck 49 to replace the water in bottle chamber 62 and reduce the vacuum pressure in bottle chamber 62 above the water. The water will continue to flow into tank chamber 32 until the resistance to the flow of water through filter 77 equals the negative air pressure in chamber 62 of bottle 12. When the level of water 31 in tank chamber 32 falls below the bottom of filter 77, air will flow up and through hole 93 into bottle chamber 62. A supply of water will then flow through filter 77 to raise the level of the water 31 in tank 18. This water dispensing procedure is repeated until the supply of water 62 in bottle 12 reaches the top of filter 77. Bottle 12 is then removed from dispenser 10 and refilled with water. Pointer 72 is then moved to number 2 to indicate that a second bottle of water is being filtered by filter material 82. When a selected number of bottles of water have been filtered with filter material 82, for example 8 bottles of water, the effectiveness of filtering material 82 in filter 77 may be reduced to a point where a new filter should be mounted on bottle 12. Holder 88 is removed from neck 47 to expose the end of filter 77. Filter 77 can then be withdrawn from neck 47 and disposed on in an environment compatible manner. A new filter is then inserted into passage 52 of neck 47. Holder 88 is turned back onto neck 47 to retain the new filter in engagement with projections 53 to fix the position of the filter in neck 47. The solid annular wall 91 closes passage 52 and retains annular edge 92 in tight engagement with the outer surface of the casing of filter 77 thereby preventing water from flowing around filter 77 into tank chamber 32.

While there has been shown and described a preferred embodiment of a bottle having an air bleed hole and a holder, accommodating a liquid filter, it is understood that changes in the bottle, filter, holder for the filter, structure, size, shapes, materials, and arrangement of structures can be made by those skilled in the art without departing from the invention. The invention is defined in the following claims.

What is claimed is:

1. A bottle and a filter for storing a liquid usable with a liquid dispenser wherein the bottle is inverted on the dispenser to provide the dispenser with a supply of filtered liquid comprising: a bottle having a side wall with a first end and a second end, a bottom wall joined to the first end of the side wall, a top wall joined to the second end of the side wall, the side wall, bottom wall, and top wall surrounding a chamber for storing liquid, a neck joined to the top wall having a passage open to the chamber and the dispenser, a filter for removing contaminants from the liquid, said filter including an inlet opening located in the chamber to allow liquid to flow from the chamber into the filter, an outlet opening located below the inlet opening to allow liquid to flow from the chamber into the dispenser, and filtering material located between the inlet and outlet openings for removing contaminants from liquid flowing through the filtering material, said filtering material having an internal resistance to the flow of liquid through the filtering material, a holder releasably mounted on the neck for retaining the filter and positioning the filter in the passage of the neck operable to remove contaminants from liquid flowing from the chamber through the filtering material into the dispenser, and hole means in the top wall of the bottle exposed to external air for allowing air to flow into the chamber of the bottle during the flow of liquid from the chamber through the filtering material into the dispenser and preventing liquid from leaking from the chamber of the bottle through the hole means due to the internal resistance to the flow of liquid through the filtering material.

2. The bottle and filter of claim 1 wherein: the hole means for allowing air to flow into the chamber includes at least one air bleed hole in the top wall of the bottle open to the chamber.

3. The bottle and filter claim 2 wherein: said liquid is water and the at least one air bleed hole has a size to allow air to pass into the chamber to replace water moving out of the chamber without allowing water to flow out of the at least one air bleed hole.

4. The bottle and filter of claim 1 wherein: the hole means for allowing air to flow into the chamber is vertically spaced above the outlet opening of the filter to control maximum flow rate of liquid through the filtering material.

5. The bottle and filter of claim 4 wherein: the hole means for allowing air to flow into the chamber includes at least one air bleed hole in the top wall of the bottle open to the chamber.

6. The bottle and filter of claim 5 wherein: the hole means in the top wall of the bottle is at a location that establishes a minimum hydrostatic pressure acting on the filter in view of the internal resistance to the flow of liquid through the filtering material.

7. A bottle and a filter for storing liquid usable with a liquid dispenser wherein the bottle is inverted in the dispenser to provide the dispenser with a supply of liquid, the bottle comprising a bottle having a side wall having a first end and a second end, a bottom wall joined to the first end, a top wall joined to the second end, the side wall, the bottom wall and the top wall defining a chamber for storing liquid, a neck portion joined to the top wall having a passage open to the chamber and the dispenser, a filter having a side wall surrounding filtering material operable to remove contaminants from liquid flowing from the chamber through the filtering material into the dispenser, said filtering material having an internal resistance to the flow of liquid through the filtering material, a means engagable with the side wall of the filter to retain the filter on the neck portion joined to the top wall, and hole means in the side wall of the bottle exposed to external air for allowing air to flow into the chamber of the bottle during the flow of liquid from the chamber through the filtering material into the dispenser and the hole means having a size to allow air to pass into the chamber in order to replace the liquid moving out of the chamber, at the same time, preventing the liquid from leaking from the chamber of the bottle through the hole means due to the internal resistance to the flow of liquid through the filtering material.

8. The bottle and filter of claim 7 wherein: the filter includes an inlet opening within the chamber, an outlet opening externally of the bottle, and said filtering material between the inlet and outlet openings for removing contaminants from liquid flowing through the filtering material.

9. A The bottle and filter of claim 8 wherein: the hole means for allowing air to flow into the chamber is vertically spaced above the outlet opening of the filter to control maximum flow rate of liquid through the filtering material.

10. The bottle and filter of claim 8 wherein: the hole means for allowing air to flow into the chamber includes at least one air bleed hole in the side wall of the bottle open to the chamber.

11. The bottle and filter of claim 7 wherein: the hole means for allowing air to flow into the chamber includes at least one air bleed hole in the side wall of the bottle open to the chamber.

12. The bottle and filter of claim 7 wherein: the hole means in the side wall of the bottle is at a location that establishes a minimum hydrostatic pressure acting on the filter in view of the internal resistance to the flow of liquid through the filter.

13. A bottle and filter for storing a liquid dispenser wherein the bottle is inverted on the dispenser to provide the dispenser with a supply of filtered liquid comprising: a bottle having wall means surrounding a chamber for storing a liquid, a neck joined to the wall means having a passage open to the chamber and the dispenser, a filter having filtering material for removing contaminants from the liquid, a holder releasably mounted on the neck for retaining the filter and positioning the filter in the passage of the neck whereby the filtering material is operable to remove contaminants from liquid flowing from the chamber through the filtering material into the dispenser, said filtering material having an internal resistance to the flow of liquid through the filtering material, and hole means in the neck exposed to external air for allowing air to flow into the chamber of the bottle during the flow of liquid from the chamber through the filtering material into the dispenser and preventing liquid from leaking from the chamber of the bottle through the hole means due to the internal resistance to the flow of liquid through the filtering material.

14. The bottle and filter of claim 13 wherein: the filter includes an inlet opening within the chamber, an outlet opening externally of the bottle, and said filtering material between the inlet and outlet openings for removing contaminants from liquid flowing through the filtering material.

15. The bottle and filter of claim 14 wherein: the hole means for allowing air to flow into the chamber is vertically spaced above the outlet opening of the filter material to control maximum flow rate of liquid through the filter material.

16. The bottle and filter of claim 15 wherein: the hole means for allowing air to flow into the chamber includes at least one air bleed hole in the neck of the bottle open to the chamber.

17. The bottle and filter of claim 13 wherein: the hole means is one hole located in the neck of the bottle.

18. The bottle and filter of claim 17 wherein: said liquid is water and the at least one air bleeds a size to allow air to pass into the chamber to replace water moving out of the chamber without allowing water to flow out of the at least one air bleed hole.

19. The bottle and filter of claim 13 wherein: the hole means for allowing air to flow into the chamber includes at least one air bleed hole in the neck of the bottle open to the chamber.

20. The bottle and filter of claim 13 wherein: the hole means in the neck is at a location that establishes a minimum hydrostatic pressure acting on the filter in view of the internal resistance to the flow of liquid through the filter.

21. The bottle and filter of claim 13 including: a second neck connected to the top wall having a passage open to the chamber useable to fill the chamber with a liquid.

22. A bottle for storing liquid usable with a filter having filtering material and a liquid dispenser wherein the bottle is inverted in the dispenser to provide the dispenser with a supply of filtered liquid, comprising wall means including a top wall and a side wall surrounding a chamber for accomodating a liquid, a neck joined to the top wall having a passage open to the chamber and the dispenser when the bottle is inverted on the dispenser for accomodating a filter having filtering material for removing contaminants from the liquid flowing through the filtering material, said filtering material having an internal resistance to the flow of liquid through the filtering material, and hole means in one of the top wall, side wall or neck of the bottle exposed to external air at a location that establishes the minimum hydrostatic pressure acting on the filtering material in view of the internal resistance to the flow of liquid through the filter for allowing air to flow into the chamber of the bottle during the flow of liquid from the chamber through the filtering material into the dispenser and the hole means having a size to allow air to pass into the chamber in order to replace the liquid moving out of the chamber, at the same time, preventing the liquid from leaking from the chamber of the bottle through the hole means due to the internal resistance to the flow of liquid through the filtering material.

23. The bottle of claim 22 including: a second neck connected to the top wall having a passage open to the chamber.

* * * * *